(12) United States Patent
Stau et al.

(10) Patent No.: US 8,157,223 B2
(45) Date of Patent: Apr. 17, 2012

(54) HOLDER FOR AN ELONGATE ARTICLE

(75) Inventors: Bastian Stau, Weimar (DE); Ernst-Ludwig Hahn, Rabenau (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/511,597

(22) Filed: Jul. 29, 2009

(65) Prior Publication Data

US 2010/0025272 A1 Feb. 4, 2010

(30) Foreign Application Priority Data

Jul. 30, 2008 (DE) .......................... 10 2008 036 563

(51) Int. Cl.
*F16L 3/08* (2006.01)
(52) U.S. Cl. ...................................... 248/74.2; 248/74.4
(58) Field of Classification Search .................. 206/443, 206/446; 248/68.1–74.4
See application file for complete search history.

(56) References Cited

U.S. PATENT DOCUMENTS

| | | | |
|---|---|---|---|
| 4,669,156 A * | 6/1987 | Guido et al. ................. | 248/74.3 |
| 4,881,705 A | 11/1989 | Kraus | |
| 4,896,465 A * | 1/1990 | Rhodes et al. ............... | 248/74.2 |
| 5,257,768 A * | 11/1993 | Juenemann et al. ......... | 248/74.2 |
| 7,201,352 B2 * | 4/2007 | Kawai .......................... | 248/74.1 |
| 2005/0116122 A1 * | 6/2005 | Nakanishi .................... | 248/68.1 |

FOREIGN PATENT DOCUMENTS

| DE | 4039822 C1 | 12/1990 |
|---|---|---|
| DE | 102004054403 A1 | 6/2005 |

* cited by examiner

*Primary Examiner* — Bryon Gehman
(74) *Attorney, Agent, or Firm* — Michael P. Leary

(57) ABSTRACT

A holder for at least one elongate article, with a main part on which is formed at least one receptacle into which the article can be introduced, and with a lid part which is movably connected to the main part via a joint and closes the receptacle in a closed position at least the main part having a hard component portion and a soft component portion connected thereto, the soft component portion forming the receptacle for the article. The joint is also formed by the soft component portion.

7 Claims, 3 Drawing Sheets

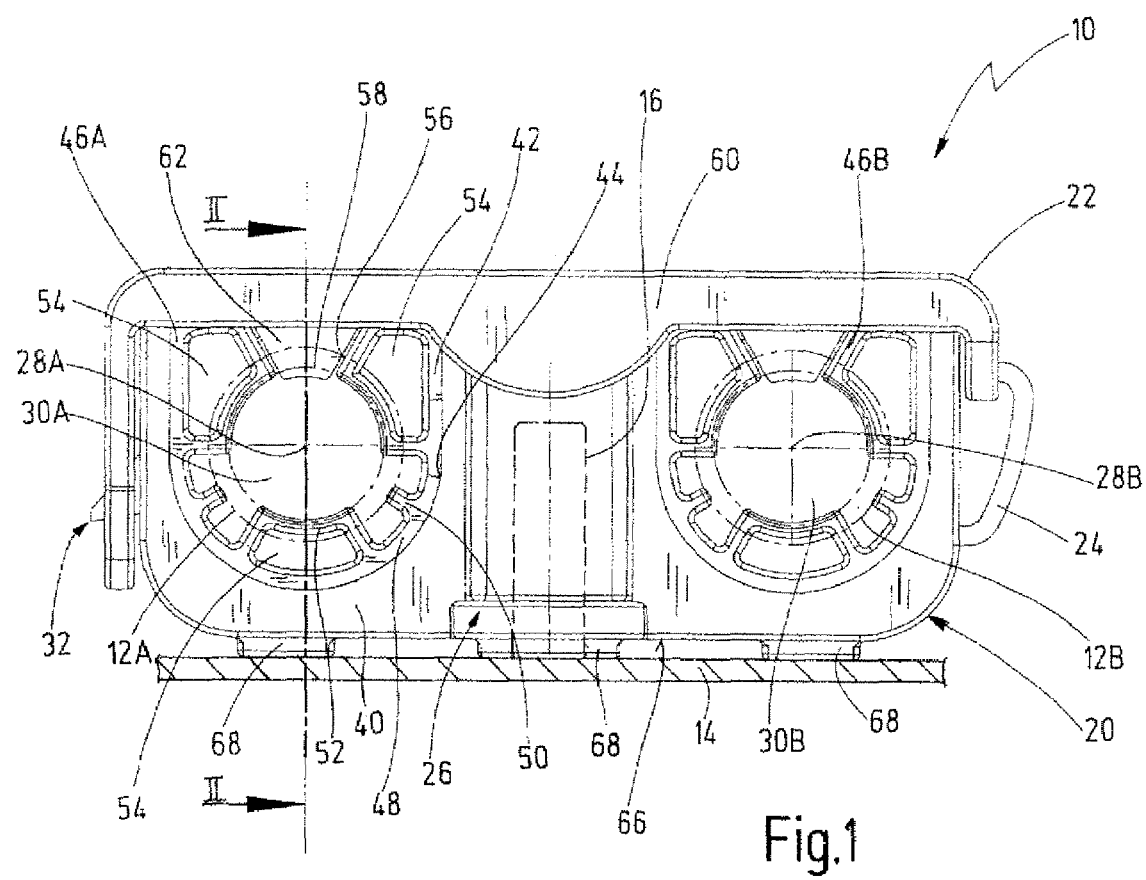
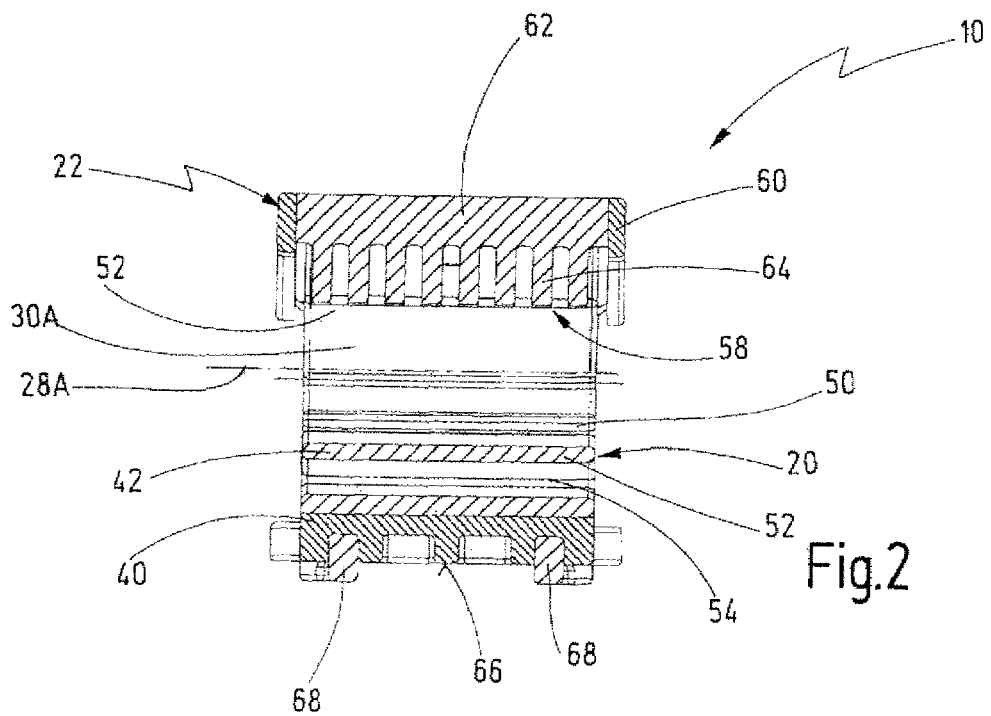

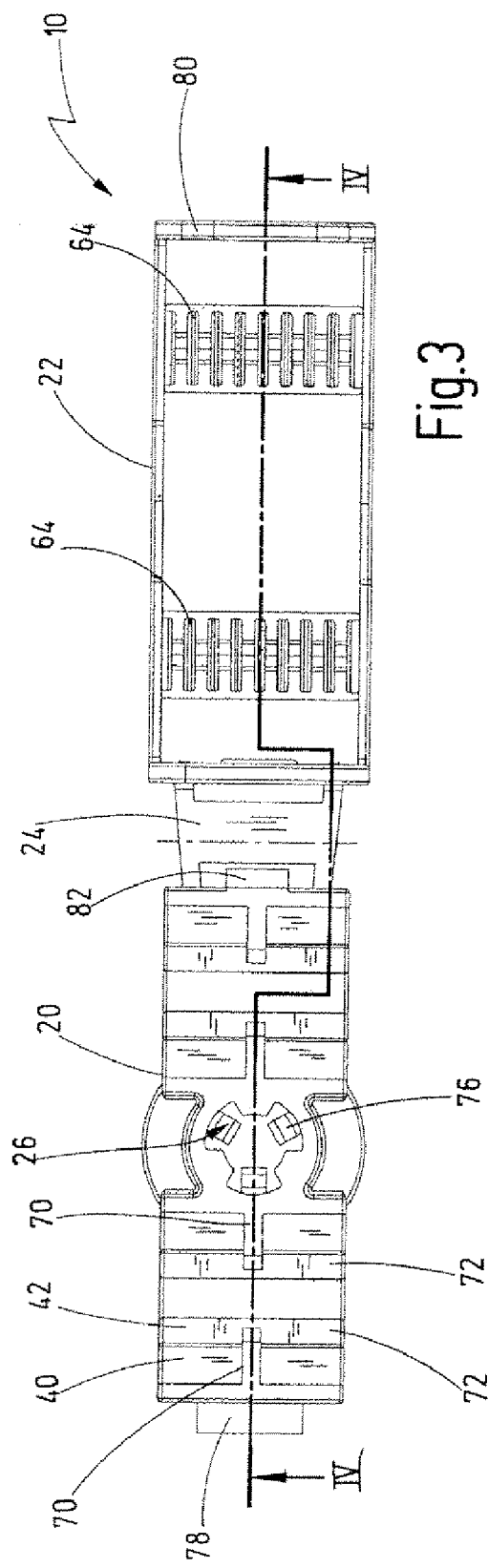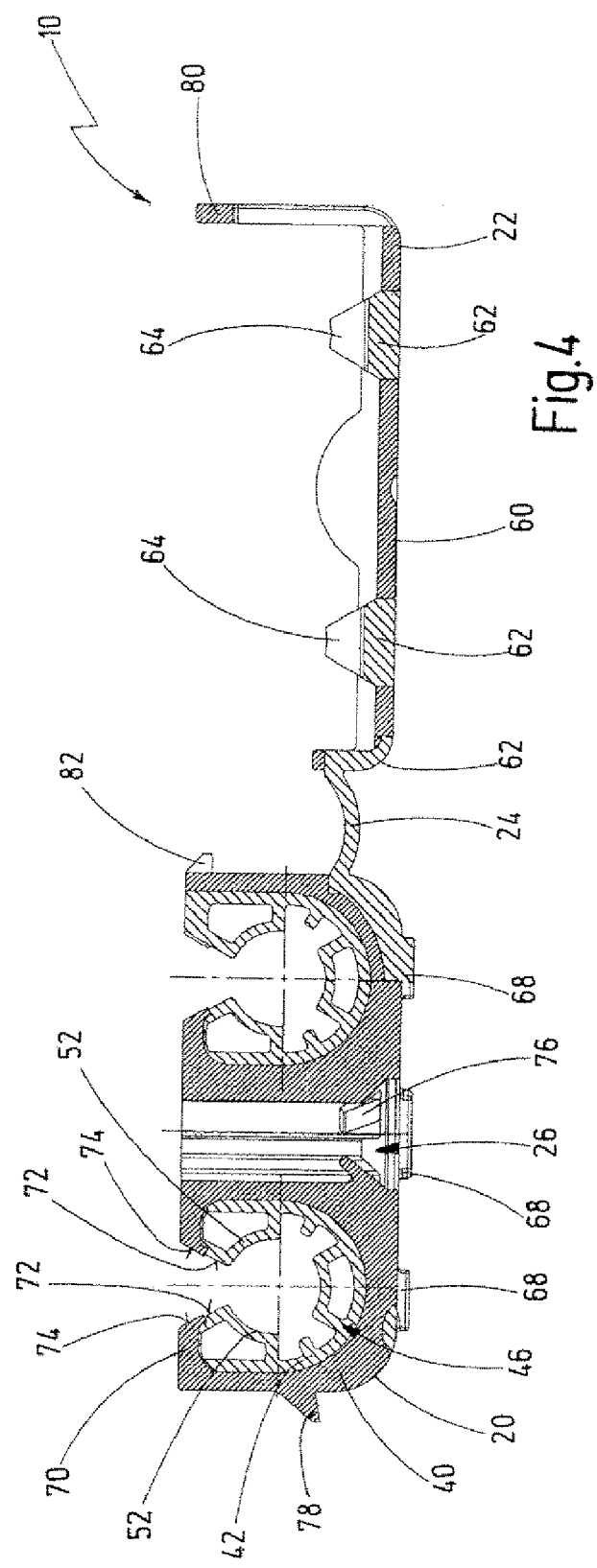

HOLDER FOR AN ELONGATE ARTICLE

CROSS-REFERENCE TO RELATED APPLICATIONS

This application claims priority from German Patent Application No. 10 2008 036 563.7, filed on Jul. 30, 2008, the disclosure of which is incorporated herein by reference.

FIELD OF THE INVENTION

The present invention relates to a holder for at least one elongate article, with a main part on which is formed at least one receptacle into which the article can be introduced, and with a lid part which is movably connected to the main part via a joint and closes the receptacle in a closed position, at least the main part having a hard component portion and a soft component portion connected thereto, the soft component portion forming the receptacle for the article.

A holder of this type is for example known from document U.S. Pat. No. 4,881,705.

The holder known from this document contains a main part and a lid part made of a relatively hard plastics material. The main part and the lid part are joined together via a film hinge. Portions made of a relatively softer material are formed integrally both with the main part and with the cover part, using what is known as two-component injection moulding.

A further holder of this type is known from document DE 10 2004 054 403 A1. In this holder, the main part and the cover part each have in the longitudinal direction continuous cavities into which the soft component portion is cast on after the manufacture of the main part and lid part.

Furthermore, document DE 40 39 822 C1 discloses a pipeline holder having a main part and a lid part connected via a film hinge. It is possible to mount into the main part a receiving body which is made of soft resilient material which contains, in turn, a basic part which can be inserted into the main part and an upper part articulated thereto.

The film hinge constructions used in the known pipeline holders project relatively far to allow the required radii of bend without damage resulting from excessive mechanical stress.

According to exemplary embodiments consistent with the present invention, the joint is formed by the soft component portion.

On the one hand, this allows a lower overall size of the holder to be achieved, as the soft component portion facilitates smaller dimensions of the joint or of the hinge.

In addition, the material properties for the hard component are utilized more effectively, as allowance does not have to be made for the functioning of the joint. For example, the hard component portion can also be made of a fibre material by means of which it would not be possible, or would be possible only with difficulty, to produce a film hinge.

In addition, a simpler mould construction can be obtained as a result of the formation of the joint by means of the soft component portion, owing to the better filling of the main part and of the lid part.

The soft component portion can be used to damp vibrations acting from the holder onto the article or vice versa. Overall, the holding property can be improved in this way.

The hard component portion and the soft component portion may be made of plastics material.

The joint may be connected to the soft component portion, forming the receptacle, of the main part.

In this embodiment, the joint is connected to the soft component portion, forming the receptacle, of the main part, generally through a recess in the hard component portion. This improves the integrity of the holder.

The lid part may have a hard component portion and a soft component portion connected thereto, the joint being connected to the soft component portion of the lid part.

In this embodiment, the soft component portion extends, as an overall soft component portion, preferably through the hard component portion of the main part and through the hard component portion of the lid part and forms preferably a single strand.

According to a further embodiment, the receptacle may have a radial opening via which the article can be introduced into the receptacle in the radial direction, the lid part having a closure portion which closes the radial opening in the closed position of the lid part.

This allows the article received in the receptacle to be completely surrounded, thus producing a precise position of the article that is preferably oriented at all times concentrically with a longitudinal axis of the receptacle.

The lid part may have a hard component portion and a soft component portion connected thereto, the closure portion being formed by the soft component portion.

In this embodiment, it is furthermore possible for vibrations acting from the article onto the lid part or vice versa to be damped.

Furthermore, the closure portion may act on an inserted article in the closed position of the lid part.

In this embodiment, the closure portion can furthermore serve to increase the axial holding force which is exerted onto the article.

In this case, the closure portion may have a first clamping portion, which acts on the article inserted into the receptacle in such a way as to inhibit displacement of the article in a first longitudinal direction, and has a second clamping portion which acts on the article inserted into the receptacle in such a way as to inhibit displacement of the article in the opposite longitudinal direction.

This allows the axial holding force to be increased in both directions.

The closure portion may be formed by a plurality of clamping segments which are arranged next to one another in a longitudinal direction defined by the receptacle.

On the one hand, the plurality of clamping segments allow articles of differing diameter to be inserted into the receptacle. On the other hand, suitable formation of the clamping segments can allow a first number of clamping segments to form a first clamping portion and a second number of clamping segments to form a second clamping portion.

Overall, a guide portion of the main component portion of the main part may project into a radial opening of the receptacle formed by the soft component portion to facilitate radial introduction of an article into the receptacle.

As higher friction is generally established between the soft component portion and the article, there tends to be the risk that parts of the soft component portion become pressed-in on insertion of the article into the receptacle. This is the case especially when the diameter of the radial opening is smaller than the diameter of the article to be inserted.

The guide portion can allow the article to be guided substantially along the hard component portion on introduction into the receptacle. Lower friction is established between the hard component portion and the article. Furthermore, it is generally not possible for the hard component portion to become markedly deformed. This can facilitate the radial introduction of an article into the receptacle.

According to a further embodiment, the soft component portion of the main part may have at least one foot portion which protrudes relative to an underside of the main part that opposes the receptacle.

The term "an underside of the main part" refers in the present document in particular to a side of the main part that rests against a workpiece such as a metal sheet to which the article is to be fastened. The foot portion can be used to damp vibrations acting from the workpiece onto the holder and vice versa.

The foot portion is in this case may be connected to the soft component portion forming the receptacle and may be part of the overall soft component portion.

The hard component portion of the main part may have a fastening portion for fastening the holder to a workpiece.

This may be a stud receptacle into which a stud which is secured to the workpiece can be introduced and secured, for example in a locking manner. Alternatively, the fastening portion can however also allow a screw, a nut or the like to be received.

The holder may be formed in one piece and by a two-component injection moulding manufacturing method to produce a two-component injection molded part.

This refers to the fact that the holder is manufactured in an injection mould, the hard component portion of the main part and lid part being extruded in a first step. In a second step, the overall soft component portion is extruded within the same mould.

It will be understood that the features mentioned hereinbefore and those to be described hereinafter can be used not only in the respectively specified combination, but rather also in other combinations or in isolation, without departing from the scope of the present invention.

BRIEF DESCRIPTION OF THE DRAWINGS

Exemplary embodiments of the invention are illustrated in the drawings and will be described in greater detail in the subsequent description. In the drawings:

FIG. 1 is a side view (in the longitudinal direction) of a holder according to an embodiment of the invention;

FIG. 2 is a cross section along the line II-II from FIG. 2;

FIG. 3 shows the holder of FIGS. 1 and 2 from above in an opened position;

FIG. 4 is a cross section along the line IV-IV from FIG. 3;

DETAILED DESCRIPTION OF EXEMPLARY EMBODIMENTS OF THE INVENTION

Figure 5:
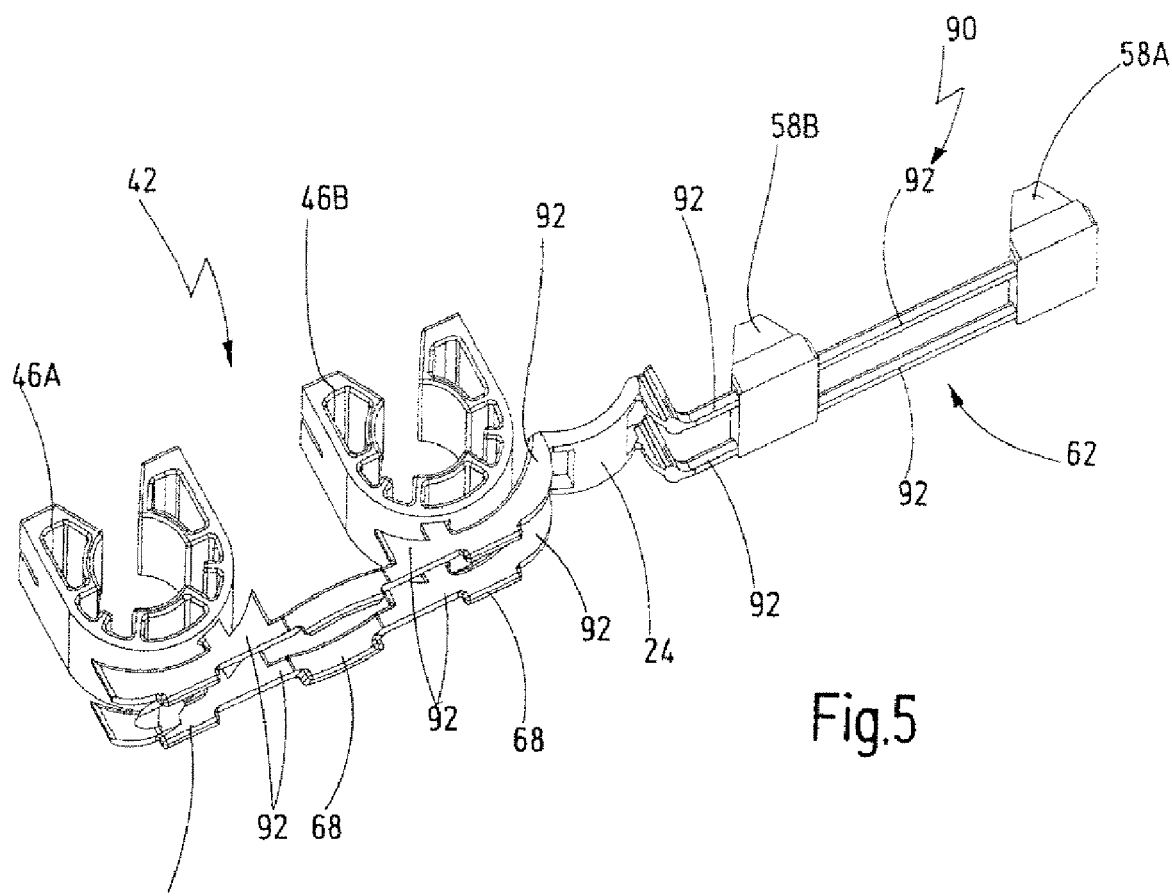
FIG. 5 is a perspective view of the overall soft component portion of the holder of FIGS. 1 to 4.

In FIGS. 1 and 2, a holder according to an exemplary embodiment of the invention is generally denoted by reference numeral 10. The holder 10 serves to fasten two elongate articles 12A, 12B, such as tubes, cables, cable strands, petrol lines, etc., to a workpiece 14. The workpiece 14 can for example be a bodywork metal sheet of a motor vehicle. A stud 16 is secured to the workpiece 14, for example by what is known as stud welding or stud bonding. The stud 16 protrudes relative to a surface of the workpiece 14, and the holder 10 is fastened thereto.

The holder 10 has a main part 20 and a lid part 22 which are non-detachably joined together via a joint or hinge 24.

The main part 20 has a central fastening portion 26 which is configured to secure the main part 20 to the stud 16. The stud 16 is schematically illustrated in FIG. 1.

The main part 20 further has a least one receptacle, in the present case two receptacles 30A, 30B, for the articles 12A, 12B. The receptacles 30A, 30B are arranged on opposing sides of the fastening portion 26. The receptacles 30 define longitudinal axes 28A, 28B which in the present case are oriented parallel to each other and coincide with the longitudinal axes of received articles 12A, 12B (or at least are oriented parallel thereto).

The lid part 22 is shown in FIG. 1 in a closed position in which it closes the receptacles 30A, 30B, thus preventing inserted articles 12A, 12B from being removed from the holder 10 in the radial direction. The lid part 22 is for this purpose securely connected to the main part 20 by means of an interlocking arrangement 32. The interlocking arrangement 32 is formed on an end face opposing the joint 24, adjacent to the receptacle 30A, and can for example be configured as a locking arrangement.

The main part 20 has a hard component portion 40 made of a relatively hard plastics material and a soft component portion 42 made of a relatively soft plastics material (for example thermoplastic elastomers), the relatively soft plastic material being softer than the relatively hard plastic material.

The hard component portion 40 contains the fastening portion 26 and has on the opposing sides thereof in each case U-shaped recesses 44. A receiving portion 46A, 46B, which is made out of the soft component portion 42 and forms the respective receptacle 30A, 30B, is arranged in each of the U-shaped recesses 44

Details of the receptacles 30A, 30B for the two articles 12A, 12B will be described hereinafter merely with reference to one of the two receptacles. Each of the receptacles are however identical in their formation, so that the description applies equally to the other receptacle.

The receiving portion 46 has a U-shaped basis portion 48 which is arranged in the U-shaped recesses 44. At least one web 50 (in the present case two webs 50, only one of which is provided with a reference numeral) extends from the radial inner side of the U-shaped basis portion 48 in the radial direction. Bridges 52, which, together with the U-shaped basis portion 48, each define a cavity 54, are formed on the radially inner side of the U-shaped basis portion 48.

More precisely, a bridge 52 is arranged at the base of the U-shaped basis portion 48, the two webs 50 being arranged adjacent thereto. Furthermore, bridges 52, which define between them a radial opening 56, are provided in each case in the region of the free U-legs of the U-shaped basis portion 48. The radial opening 56 is smaller than the diameter of the smallest article 12A to be inserted.

When an article 12 is inserted into the receptacle 30, the bridges 52 defining the radial opening 56 are pressed radially and/or tangentially outward and engage behind the inserted article 12 as soon as said article is located in the receptacle 30. Accordingly, the holder is suitable for example also for "overhead mounting".

Closure portions 58, which are configured to close the radial openings 56 in the closed position of the lid part 22, are formed on the lid part 22, on the side opposing the main part 20.

The lid part 22 has, like the main part 20, a hard component portion 60 and a soft component portion 62. The closure portion 58 is in this case formed from the soft component portion 62. More precisely, the closure portion 58 has a plurality of clamping segments 64 which are arranged laterally next to one another and set apart from one another in the direction of the longitudinal axis 28. The clamping segments 64 are formed so as to be substantially trapezoidal in cross section (see FIG. 1) and are adapted to the correspondingly shaped radial opening 56.

The soft component portion 42 of the main part 20 contains a plurality of foot portions 68 extending, relative to the hard component portion, from the underside 66 of the main part 20. More precisely, the foot portions 68 extend from the side of the main part 20 that faces the workpiece 14. The foot portions 68 serve in this case to damp vibrations which can be transmitted between the workpiece 14 and the holder 10.

In the present case, the soft component portion 42 contains six foot portions 68, four of which are arranged in the outer corners of the base area of the underside 66. Two further foot portions 68 are arranged adjacent to the fastening portion 26.

FIGS. 3 and 4 show the holder 10 in an opened position. It may be seen in this case that the hard component portion 40 of the main part 20 has in the region of the receptacles 30 radial webs 70 extending from the free ends of the U-shaped recess 44 radially inward toward the radial opening 56, through the receiving portion 46.

The receiving portion 46 made from the soft component portion 42 has in the region of the radial opening 56 opposing introduction surfaces 72 which taper conically in cross section. The purpose of these introduction surfaces is to facilitate centric introduction of an article 12 through the radial opening 56 in the radial direction. The radial webs 70 extend through to the radial opening and have in a corresponding manner conically tapering guide portions 74. The guide portions 74 are formed in the upper (i.e. radially outer) part of the radial opening 56 and protrude slightly relative to the introduction surfaces 72. This allows an article 12 to be introduced to act firstly on the conically tapering guide portions 74. As the friction between the hard component portion 40 from which the guide portions 74 are formed and an article 12 to be introduced is much lower than the friction thereof with the soft component portion 42, the introduction operation can be greatly facilitated as a result. In particular, it is possible to prevent the webs or bridges 52 which are present in the region of the radial opening 56 from bending off downward owing to frictional forces and blocking the receptacle 30 or ensuring non-uniform or non-symmetrical mounting of the article 12.

FIGS. 3 and 4 also show that the fastening portion 26 has one or more (in the present case three) locking lugs 76 which are configured to act on the stud 16 (for example on a flange portion or on a threaded portion thereof). Accordingly, the main part 20 can be secured to the workpiece 14 in a simple manner, i.e. by pressing the main part 20 onto the stud 16, the stud 16 penetrating a preferably continuous recess of the fastening portion 26. In this case, the locking lugs 76 engage behind radial projections on the stud 16. The end position on the workpiece 14 is reached when the foot portions 68 rest on the upper side of the workpiece 14. Said foot portions can if appropriate also be resiliently compressed, thus if appropriate allowing a further locking stage to be attained on the stud 16. This can improve the holding of the main part 20 on the workpiece 14.

Furthermore, an interlocking lug 78 and a holding lug 82 of the interlocking arrangement 32 are formed on the main part 20, on the hard component portion 40 thereof. These lugs are arranged on opposing end faces of the main part 20 and configured to enter into engagement with corresponding interlocking elements of the lid part 22. The interlocking lug 78 is in this case arranged on the end face of the main part 20 opposing the joint 24 and configured to enter into engagement with an interlocking tab 80 formed on the lid part 22. The interlocking tab 80 is in this case provided on the side of the lid part 22 that opposes the joint 24.

The interlocking state, in which the interlocking tab 80 engages behind the interlocking lug 78, may be seen on the left-hand side in FIG. 1.

The locking lug 82 serves as an abutment on the opposing side of the main part 20. As will be described hereinafter, the function of an abutment of this type is preferably performed not by the joint 24. Said joint is made from the soft component portion, whereas the holding lug 82 is formed from the hard component portion 60 of the lid part 22.

As described above, the main part 20 has a soft component portion 42, the lid part 22 has a soft component portion 62, and the joint 24 is also formed from the soft component. In the present case, the holder 10 is manufactured by two-component injection moulding in which the hard component portions 40, 60 of the main part 20 and of the lid part 22 are firstly extruded within a mould and an overall soft component portion 90, which contains the soft component portions 42, 62 and 24, is subsequently extruded in the same mould. FIG. 5 is a perspective view of this overall soft component portion 90 which contains on the main part 20 the receiving portions 46A, 46B and the foot portions 68. On the lid part 22, the overall soft component portion 90 contains the closure portions 58B, 58A. Furthermore, the individual soft component portions are joined together within the main part 20 or the lid part 22 by inner strands 92. Furthermore, these inner strands 92 are also connected to the joint 24. This produces a non-detachable connection between the overall soft component portion 90 and the hard component portions 40, 60 of the main part 20 or of the lid part 22.

Figure 6:
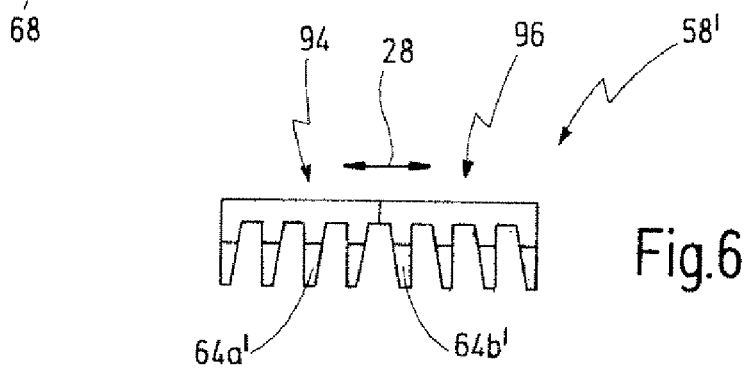
FIG. 6 shows an alternative embodiment of a closure portion for the lid part of the holder of FIGS. 1 to 5.
Figure 7:
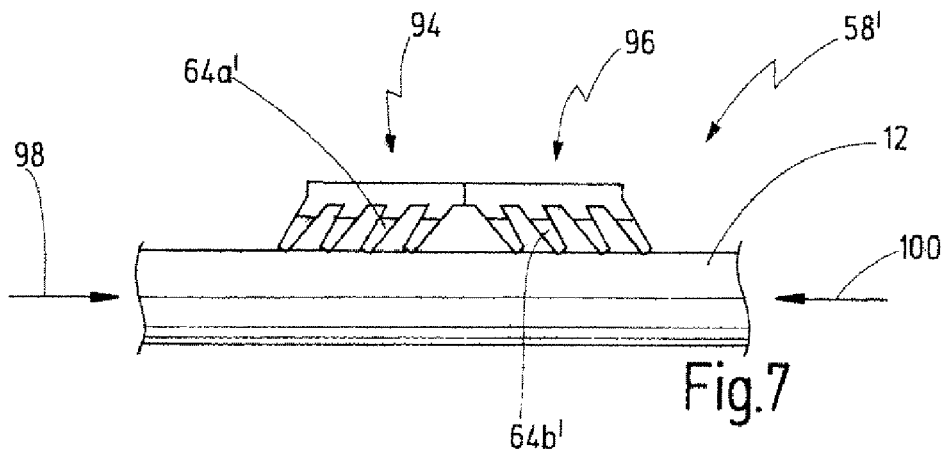
FIG. 7 shows the closure part of FIG. 6 in abutment against an article which is inserted into the holder.

FIGS. 6 and 7 show an alternative embodiment of a closure portion which is denoted by reference numeral 58'.

Whereas in the case of the closure portion 58 of FIGS. 1 to 5 the clamping segments 64 are each of uniform thickness in the longitudinal direction 28, the closure portion 58' is divided into a first clamping portion 94 and a second clamping portion 96 which are arranged adjacent to each other in the longitudinal direction 28.

In the first clamping portion 94, the individual clamping segments 64a' are each bevelled on the side pointing toward the centre. In a corresponding manner, the clamping segments 64b' of the second clamping portion 96 are each bevelled on the side pointing toward the centre. As a result, the bending direction of the clamping segments 64a', 64b' is predetermined. Insofar as the closure portion 58' enters into abutment against an article 12, such as is shown in FIG. 7, the clamping segments 64a', 64b' each bend outward away from the centre in the longitudinal direction.

This allows the closure portion 58' to exert an increased holding force onto the article 12 in the longitudinal direction 28. More precisely, the clamping segments 64a' inhibit movement of the article 12 in a first longitudinal direction 98 (as a result of which in this case the clamping segments 64a' had for this purpose to be further compressed). Furthermore, the clamping segments 64b' inhibit movement of the article 12 in the opposite longitudinal direction 100 (in this case, the clamping segments 64b' would be compressed).

This increased holding force results in particular from the increased frictional force between the bent-off clamping segments 64a', 64b' which are formed from the soft component portion 62.

As may be seen in particular in FIG. 1, the bridles 52 and the webs 50 can be pressed together in the radial direction (in particular owing to the cavities 54 formed by the bridges 52).

Furthermore, the bridges 52 are each arranged distributed substantially uniformly over the circumference of the receptacle 30.

Accordingly, it is possible to insert the articles 12 of differing diameter into the receptacle 30, these articles each being arranged concentrically with the longitudinal axis 28. This is indicated in FIG. 1 by two concentric circular dot-dash lines one of which is denoted by reference numeral 12A or 12B respectively.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A holder for an elongate article, the holder comprising:
a main part formed of a hard material;
a lid part formed of the hard material and separate from the main part and not connected to the main part by hard material;
a soft component formed by injection molding of a soft material onto the main part and the lid part, the soft component including:
a receptacle attached to the main part and configured to receive the elongate article; the receptacle including a radial opening via which the elongate article can be introduced into the receptacle in the radial direction, and the soft component includes a closure portion attached to the lid part and which closes the radial opening in the closed position of the lid part, the closure portion including a first clamping portion and a second clamping portion, the first clamping portion further includes a first plurality of clamping segments arranged and spaced laterally in the first longitudinal direction, and the individual clamping segments extend radially inward from the closure portion and extend circumferentially within the radial opening, the first plurality of clamping segments is configured to touch the elongate article and inhibit displacement of the elongate article in a first longitudinal direction, and the second clamping portion is configured to touch the elongate article and inhibit displacement of the article in the opposite longitudinal direction; and
a joint whereby the lid part is connected to the main part so that the lid part is movable between an open position, wherein the receptacle is accessible for radial insertion of the elongate article, and a closed position.

2. The holder according to claim 1, wherein the first plurality of clamping segments comprises a plurality of flaps arranged next to one another in a longitudinal direction defined by the receptacle.

3. The holder according to claim 2, wherein a guide portion of the main part projects into a radial opening of the receptacle formed by the soft component portion to facilitate radial introduction of the elongate article into the receptacle.

4. The holder according to claim 3, wherein the soft component further includes a foot portion which protrudes relative to an underside of the main part that opposes the receptacle.

5. The holder according to claim 4, wherein the main part has a fastening portion for fastening the holder to a workpiece.

6. The holder according to claim 2, wherein the individual flaps comprising the first plurality of clamping segments are trapezoidal in axial profile.

7. The holder according to claim 2, wherein the second clamping portion includes a second plurality of clamping segments comprising a second plurality of flaps, and the longitudinal cross sections of each of the first plurality of flaps tapers in a first axial direction, and the longitudinal cross sections of each of the second plurality of flaps tapers in a second axial direction opposite to the first direction.

* * * * *